May 8, 1973   R. E. WALTERS   3,732,113
METHOD AND APPARATUS FOR PREPARING A POULTRY PRODUCT
Filed Feb. 12, 1971
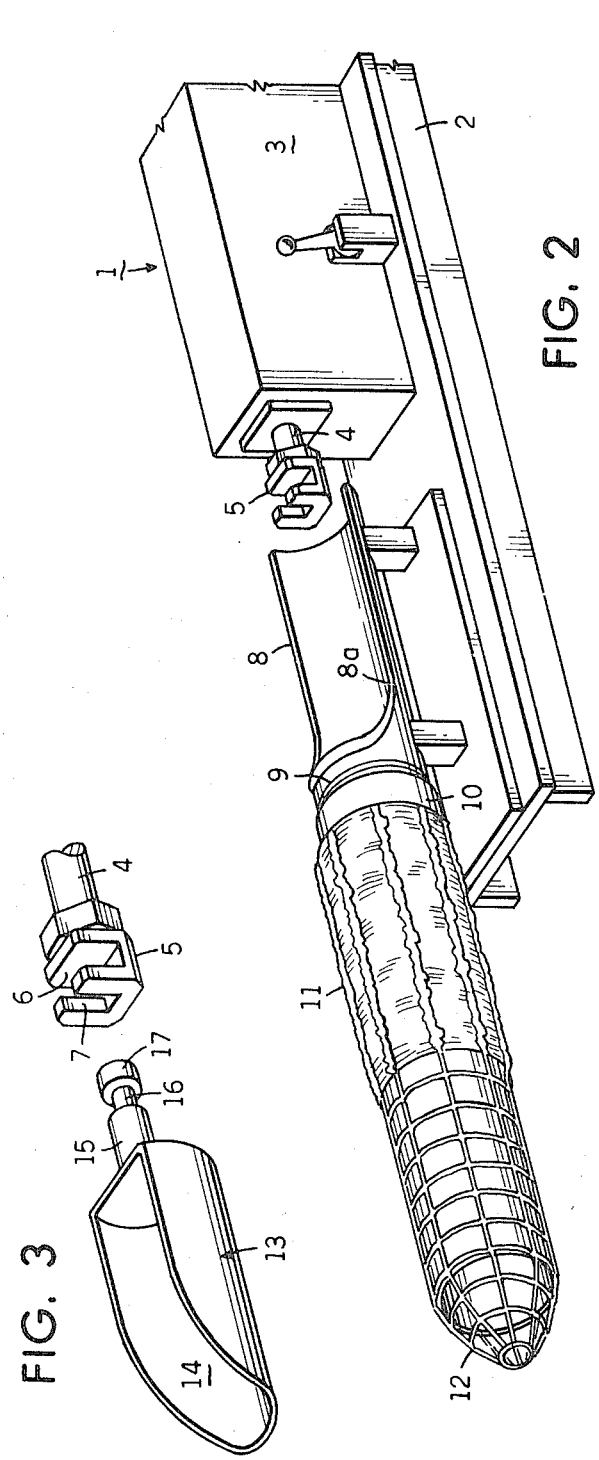
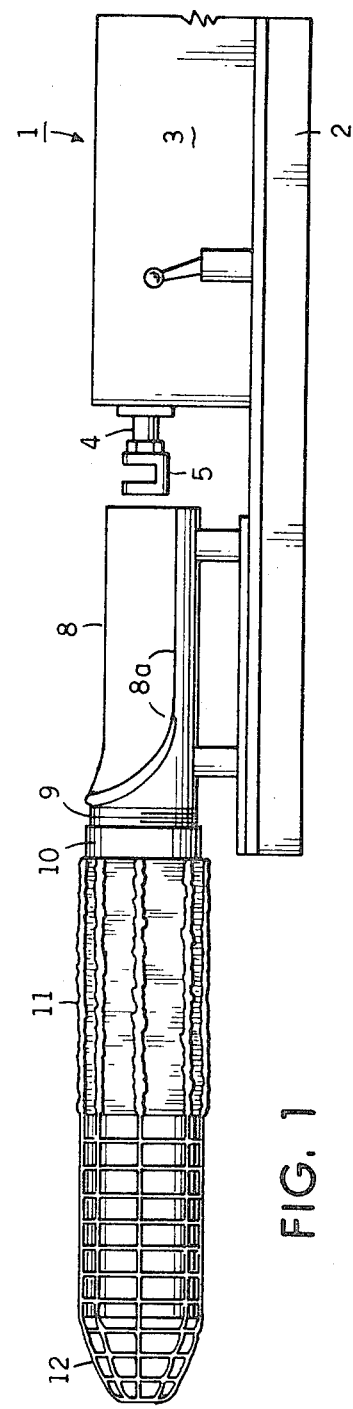
INVENTOR
ROGER E. WALTERS
BY
*Lawrence J. Hurst*
ATTORNEY

United States Patent Office 3,732,113
Patented May 8, 1973

3,732,113
METHOD AND APPARATUS FOR PREPARING A POULTRY PRODUCT
Roger E. Walters, Glendale, Mo., assignor to Ralston Purina Company, St. Louis, Mo.
Filed Feb. 12, 1971, Ser. No. 115,028
Int. Cl. B65b 25/06
U.S. Cl. 99—174                7 Claims

ABSTRACT OF THE DISCLOSURE

A poultry roll which is fabricated by surrounding poultry meat with an artificial skin may be assembled and tied together in a single operation. A scoop unit having a shape conforming to a portion of the desired configuration of the poultry roll is utilized. An artificial or fabricated skin is placed within the scoop unit, pieces of poultry meat are layered on the artificial skin, and the artificial skin is folded over the layered poultry meat to substantially surround the poultry meat. The scoop unit containing the poultry meat roll is then connected to a ram which is effective to insert the scoop unit and poultry meat roll through an arbor having a prestretched net material thereon. The net material grippingly engages the poultry roll while releasably engaging the scoop unit, and thereafter the ram retracts the scoop unit from the arbor allowing the meat roll to be retained within the net material.

BACKGROUND OF THE INVENTION

The prior art is familiar with the method of making fabricated rolls wherein molds are utilized for obtaining preshaped layers of poultry meat or wherein poultry meat is placed in layers in an aluminum pan and thereafter covered with poultry skin. The present invention is directed to a similar type product. However, it is particularly directed to a method of simply and easily shaping and tying the roll in a single operation.

In addition, the present invention is directed to the method of preparing a poultry roll wherein an artificial or fabricated skin is utilized rather than natural poultry skin. This is particularly important since in the prior art applications, when preparing poultry rolls similar to that described in the subject application, as much poultry meat as possible was retained attached to the poultry skin. With the poultry meat attached or bound to the poultry skin subsequent processing whereby the skin and meat were aligned and tied was simplified. Thus, the use of natural poultry skin would not result in misalignment or tearing of the poultry skin when it was subsequently tied or packaged.

One of the many advantages of using artificial skin for these types of products is that all the poultry skin may be utilized instead of only skin having a predetermined size and shape. This results in a more economical operation since almost all the poultry skin may be utilized and a more uniform supply of skin of the desired shape and size is available rather than relying on the run of birds to provide the necessary skin for production. However, when utilizing an artificial skin, which is completely detached from the poultry meat, severe problems are encountered in the proper alignment and handling of the poultry rolls of this class.

Also, the prior art is familiar with the use of mechanical means for preforming and shaping poultry rolls. However, these mechanical means also, of necessity, required the use of a binder cord to retain the poultry roll in its desired shape prior to the packing thereof. In addition, due to the physical working of the poultry rolls in these machines there was a great likelihood of the poultry meat being misaligned or disassociated from the artificial poultry skin.

It is, therefore, a general object of the present invention to provide a simplified means of making a poultry roll having an artificial or fabricated skin thereon.

It is another object of the present invention to provide a means for fabricating a poultry roll so that an intermediate binder cord or mold is not necessary during the processing thereof.

A further object of the present invention is to provide a simplified apparatus for use in processing poultry rolls wherein artificial or fabricated skin is utilized.

These and other objects and advantages of the present invention will become apparent from the description hereinafter.

SUMMARY OF THE INVENTION

Briefly, one aspect of the present invention comprises the method of preparing a poultry roll utilizing a fabricated skin wherein the fabricated skin is initially placed into a scoop unit, layers of meat are placed on the fabricated skin, the skin is folded over the roll encompassing the layered meat, the scoop unit and meat roll are inserted through an arbor into a net material which grippingly engages the meat roll and releasably engages the scoop unit, and the scoop unit is then removed from the poultry roll, allowing the net material to maintain the meat roll in a shaped and net tied condition.

Another aspect of the present invention comprises a machine having a fluid pressure responsive ram thereon, connector means on said ram, a scoop alignment fixture, an arbor connected to said scoop alignment fixture for holding a prestretched net material thereon and a scoop unit having other connector means thereon for locking connection with said first named connector means, said scoop unit being in locking connection with said ram when placed in the scoop alignment fixture and said ram being effective to insert and retract said scoop unit within said arbor.

BRIEF DESCRIPTION OF THE DRAWINGS

FIG. 1 is a side view of the apparatus utilized for inserting the scoop unit and poultry meat roll into the net material, FIG. 2 is an isometric view of the apparatus of FIG. 1, and FIG. 3 is an isometric view of the scoop unit utilized in the present invention.

PREFERRED EMBODIMENTS OF THE PRESENT INVENTION

In preparing the poultry loaf product of the present invention, the poultry meat is deboned in a large a piece as possible and set aside for further processing. An artificial or fabricated skin is prepared by utilizing raw poultry skin in conjunction with poultry meat and/or other edible poultry by-products. The raw poultry skin, poultry meat and/or other edible poultry by-products are formed into a matrix or emulsion having coarse particles therein. This emulsion or matrix may be formed by comminuting or reducing the size of the particles of the mixture of poultry skin and/or meat and/or edible by-products. The desirable magnitude of the particles of the matrix or emulsion should be such that the particles do not have a size dimension larger than $\frac{1}{4}''$ and preferably have at least one size dimension larger than .020" with the particle sizes falling primarily within these 2 size limitations. If all the particles were to have a size dimension larger than $\frac{1}{4}''$, the product produced would not have the desired looks of natural poultry skin and all the particles were to have dimensions less than .020" it would not produce the desired fiber structure to resemble natural poultry skin. For the foregoing, it is apparent, that to achieve the desired appearance of natural poultry skin it is necessary that a substantial portion of the particles in the matrix have sizes which do not have a dimension in excess of ¼" and which are not smaller than .020". The poultry materials are so converted to the desired particle formation by use of a standard cutter, preferably of the rotating bowl type having rotating cutter blades disposed normally to the base of the bowl, such as a Schnellkutter, or Hobart vertical cutter-mixer, but not limited to these types of cutters alone. The raw poultry material is placed in the cutter and as comminution commences, ice is gradually introduced to the cutter to lower the temperature of the ingredients therein. During the preparation of the matrix, the temperature thereof should be maintained below approximately 50° F. This is accomplished either by the addition of ice to the matrix or by pre-chilling the ingredients before they are subjected to the comminuting operation. It should be noted that it is desirable to use ice in the comminution operation since not only does the ice serve to cool the matrix but also acts as a lubricant which enables a more complete mixing of the ingredients contained in the cutter. Based upon the quantity of product in the cutter, the duration of time required to effectuate this phase will vary. However, the chopping or comminuting should be sufficient to obtain an emulsion having the size particles previously referred to. The finalized emulsion should be very tacky and paste-like in substance and have a temperature below approximately 50° F.

It is possible to form the emulsion or matrix totally from comminuted poultry skin, however, it has been found that a more desirable derma-fiber skin may be produced when poultry meat and/or edible poultry by-products such as neck meat and residual carcass meat, are contained in the emulsion. The presence of meat in the emulsion serves to reduce the shrinkage of the derma-fiber skin when it is coagulated as will be described hereinafter. The desired skin characteristics are best obtained when the poultry skin is 50% or less of the weight of the emulsion and preferably should constitute approximately 35% of the matrix. Either white or dark poultry meat will perform equally well or a combination of these meats may be used in preparing the matrix. It may be desirable to control the white and dark meat added to the matrix since the amount of dark meat used will affect the coloring of the skin when it is cooked. Preferably for the derma-fiber skin to attain the desired color, the dark meat should not exceed 50% of the meat added.

A predetermined portion of the matrix material is then subjected to pressure and heat so that it forms the size and thickness of skin desired and preferably the skin will have a thickness substantially the same as natural poultry skin. This pressing operation may be carried out in any convenient manner so that a controlled shape will be attained by the pressed out matrix. Preferably this is achieved by placing a portion of the matrix between two heated platens. The platens are designed to form the matrix into the desired shape and the heat applied by the platens makes the matrix sufficiently flowable to assume the desired shape when pressure is applied. The platens may be brought together either by hand or by mechanical means, such as an air cylinder drive depending on the operator's preference, to apply the desired pressure to shape the matrix. By heating the platens when the pressure is applied, the fat content of the matrix allows a faster and more even spread of the matrix into the desired skin shape. The pressure applied by the platens should be sufficient to spread the portion of matrix into the desired shape with a uniform thickness. The desired thickness may be controlled by having the platens engage limits which will restrict the pressing action of the platens to control the thickness of the matrix. Preferably, the platens will control the thickness of the matrix to be in the range of natural poultry skin and desirably approximately .125 inch in thickness. Other thicknesses of skin may be utilized; however, if the skin is thicker than approximately ¼", it becomes extremely difficult to work with. It is possible to utilize the pressed out matrix as a skin for poultry products, however, for ease of handling and for production purposes it is desirable to simultaneously heat the formed matrix to coagulate at least the surface proteins of the matrix. This heating and coagulation step should be carried out while the matrix is under pressure to keep the derma-fiber skin from shrinking and/or shriveling. This may be achieved by any convenient method such as having heating elements in the platens. The temperature applied to the matrix should be within the range of 110° F. to 210° F. and should be applied for a period of time from 3–30 seconds. It is desired that the heating step be effective to slightly coagulate the protein of the matrix, since any extreme cooking of the matrix results in the fabricated skin being tough when subsequently used in connection with a poultry product. Preferably the matrix should be heated to approximately 130° F. for approximately 20 seconds to achieve the proper coagulation of protein which binds the matrix to form a fabricated skin which substantially resembles natural poultry skin in looks, color and taste. The foregoing is merely illustrative of the preferred method of making a fabricated skin for use in the present invention. It should be realized that other methods of preparing an artificial skin may be utilized in practicing the present invention.

Referring now to FIGS. 1 and 2, and apparatus indicated generally at 1 is shown which is to be utilized in carrying out the present invention. The machine 1 has a base 2 and connected thereto by suitable means is a fluid pressure responsive motor or positive actuation air cylinder 3. The air cylinder 3 is of standard construction and is a well known commercially available unit. The air cylinder 3 has a push rod 4 connected thereto and attached to the outward end of the push rod 4 is a connector or fixture block 5. The fixture block 5 is provided with a slot 6 extending therethrough and another slot 7 is provided in the fixture block 5 in intersecting connection with the slot 6.

A scoop alignment fixture 8 is provided on the base by suitable means and in juxtaposition to the driving means 3 and fixture block 5. The scoop alignment fixture 8 is provided with a cylindrical configuration and has a shape or cut away portion 8A which permits a scoop member to be inserted within the alignment member 8 and removed therefrom without difficulty. The leftward end of the alignment fixture 8 is provided with a threaded portion 9 which is adapted to receive the threaded portion of a hollow arbor member 10. The arbor member 10 is constructed of a material which allows a roll of pre-stretched net material 11 to freely move thereon and the prestretched net material 11 is arranged on the arbor 10 such that it has an outwardly extended portion 12 which is beyond the leftward end of the arbor member.

Referring now to FIG. 3, a scoop member or unit 13 is shown having a shape 14 which substantially conforms to a portion of the desired configuration of the poultry roll to be produced. It should be appreciated that other configurations of the scoop unit 13 from that illustrated may be utilized, such as square, rectangular, etc. The scoop unit 13 also is provided with a connector portion 15 attached to the scoop unit by suitable means such as welds and the connector 15 is provided with an elongated neck portion 16 and engagement head 17 which are adapted for ready insertion into the slots 6 and 7 of the connector fixture 5 on the air cylinder or drive means 3. When the connector portion 15 of the scoop unit 13 is inserted in the slots 6 and 7 of the connector fixture 5 a locking connection is established therebetween, which allows the driving means 3 to move the scoop member 13 into the arbor 10 and retract it therefrom. Further, preferably the interior of the scoop unit 13 is provided with a highly polished or mirror finish which serves to reduce the friction between the scoop unit and the fabricated poulty skin placed thereon and to reduce the adhesion of the skin to the scoop unit.

After the fabricated skin is prepared according to the above, it is placed in a scoop member 13 as shown in FIG. 3. When the skin is placed within the scoop, the skin has a size such that it extends over the side walls of the scoop. The poultry meat which was previously deboned and set aside is then placed in a layered manner on top of the artificial poultry skin. The layering of the poultry meat in this manner is well known in the prior art. The meat utilized may be either all white or all dark or may be a layer of each in different ratios depending on the end product desired. Flavoring materials or spices may also be included with the layered meat. The skin is then utilized to completely encase the layered poultry meat by folding the fabricated skin over the meat. The poultry meat should be maintained in a chilled condition below approximately 50° F. during the processing thereof.

After the meat has been layered and the poultry skin folded over, the scoop unit is then placed into the scoop alignment fixture 8. The elongated neck portion 16 and engagement head 17 on the scoop member 13 are received within the slots 7 and 6, respectively, to establish the locking connection between the air cylinder 3 and the scoop member 15. Thereafter, the cylinder 3 is activated in response to an applied force which serves to drive the scoop unit and meat roll into the arbor 10 and into the net material 11 maintained on the arbor. The outwardly extending portion of the net material 12 grippingly engages the meat roll while releasably engaging the scoop. The net material 11 is advanced due to this gripping engagement so that the entire meat roll is contained within the net material. Thereafter the operator holds the net encased meat roll and the air cylinder 3 and ram 4 are deactivated or positively activated in the rightward direction in response to an applied force or air pressure supplied thereto. This movement in the rightward direction is effective to retract the scoop member 13 from the net material 11 and arbor 10 whereby the poultry roll is maintained in the net material in a net tied fashion. Since the interior of the scoop unit 13 is highly polished there is little adhesion between the skin and scoop unit as it is retracted which enables the net material 11 to completely encase the meat roll. The net material 11 which is around the poultry roll is then severed from the roll of net material on the arbor 10 at a point which enables the net material to completely encase the poultry roll and which allows the net material to extend beyond the end of the arbor 10 in the fashion as indicated at 12. The net tied poultry roll may then be frozen and distributed for subsequent use. If desired rather than using a roll of net material 11 on the arbor 10, it may be possible to utilize pre-sized pieces of net material which are adapted to completely encase the poultry roll. However, it is preferred for ease of operation to utilize the roll of net material and sever it to the desired size after the poultry roll has been secured therein.

From the foregoing, it is now apparent that a novel method and apparatus for preparing poultry products utilizing a fabricated poultry skin has been described having the objects and advantages set forth hereinbefore and that various modifications and changes may be made in the method and apparatus set forth herein by way of illustration without departing from the spirit of the invention, as defined by the claims as follows.

I claim:

1. A method of preparing and tying with a net material a poultry meat roll covered with a fabricated skin comprising the steps of placing a fabricated skin into a scoop unit and allowing a portion thereof to extend over the sides of said scoop unit, layering pieces of poultry meat on top of the fabricated skin, folding the fabricated skin over the layered poultry meat to form a poultry roll and inserting said scoop unit and poultry roll into an alignment fixture and moving said unit therefrom into an arbor having a pre-stretched tying net thereon, the tying net being effective to grippingly engage the poultry roll while releasably engaging the scoop unit and removing the scoop unit from the net tied poultry roll to allow the net to completely encase the poultry roll.

2. The method according to claim 1 wherein a roll of pre-stretched tying net is provided on the arbor and severing the tying net at a point allowing the net to completely encase the poultry roll after removal of the scoop unit from the net material.

3. The method according to claim 1 including the step of freezing the tied poultry roll.

4. The method according to claim 1 wherein the poultry meat is maintained below approximately 50° F. during the layering and tying steps.

5. Apparatus for tying meat rolls with a net material comprising a base, fluid pressure responsive driving means on said base, connection means on said driving means, a scoop alignment fixture on said base in juxtaposition to said driving means, an arbor connected to said scoop alignment fixtures for holding a pre-stretched net material thereon, and a scoop unit having other connector means thereon for releasable locking connection with said connection means on said driving means, said scoop unit having a shape conforming to a desired configuration of a meat roll and adapted to receive a meat roll therein, said scoop unit further being adapted for insertion into said alignment fixture, said driving means being responsive to an applied force for moving said scoop unit into and through said arbor for the pre-stretched net to grippingly engage the meat roll while releasably engaging said scoop unit and said driving means being responsive to a second applied force for retracting said scoop unit from said arbor.

6. The apparatus according to claim 5 wherein said driving means comprises a positive actuation air cylinder and a push rod connected to said air cylinder, said connection means being provided on said push rod.

7. The apparatus according to claim 5 wherein the scoop unit is provided with a highly polished finish on the interior thereof to prevent the meat roll from adhering to the scoop unit.

References Cited

UNITED STATES PATENTS

| 2,685,996 | 8/1954 | Shaffner | 99—174 X |
| 2,885,850 | 5/1959 | Smith | 53—258 |
| 2,922,186 | 1/1960 | Sarture | 99—174 X |
| 2,956,886 | 10/1960 | Baush | 99—174 X |
| 3,208,193 | 9/1965 | Rumsey | 99—174 X |
| 3,344,467 | 10/1967 | Barbu | 53—258 X |
| 3,503,180 | 3/1970 | Myles | 53—258 |
| 3,011,895 | 12/1961 | Toepper | 99—174 X |
| 3,237,662 | 3/1966 | Hawley | 99—174 X |

FRANK W. LUTTER, Primary Examiner

R. T. HALPER, Assistant Examiner

U.S. Cl. X.R.

53—258; 141—10